United States Patent [19]
Abshier

[11] 3,863,252
[45] Jan. 28, 1975

[54] RADAR PREDICTIONS FROM AUTOMATED STEREOPLOTTER

[75] Inventor: James O. Abshier, Milford, Mich.

[73] Assignee: The United States of America as represented by the Secretary of the Air Force, Washington, D.C.

[22] Filed: Nov. 27, 1973

[21] Appl. No.: 419,461

[52] U.S. Cl. ................................ 343/5 R, 35/10.4
[51] Int. Cl. ............................................. G01s 9/02
[58] Field of Search............. 35/10.4; 343/5 R, 5 PC

[56] References Cited
UNITED STATES PATENTS

| | | | |
|---|---|---|---|
| 2,994,966 | 8/1961 | Senitsky et al. | 35/10.4 |
| 3,539,696 | 11/1970 | Sweeney et al. | 35/10.4 |
| 3,769,442 | 10/1973 | Heartz et al. | 35/10.4 |

Primary Examiner—T. H. Tubbesing
Attorney, Agent, or Firm—Harry A. Herbert, Jr.; William Stepanishen

[57] ABSTRACT

A method is presented for generating radar predictions using an automated analytical stereoplotter for compilation and extraction of topographic information.

5 Claims, 1 Drawing Figure

RADAR PREDICTIONS FROM AUTOMATED STEREOPLOTTER

BACKGROUND OF THE INVENTION

The present invention relates broadly to a cartographic system and particularly to a radar prediction system for producing graphic products (radar predictions) which predict how an actual radar set would probably respond to terrain and other topographic features of some predefined geographic area.

For radar predictions, the basic principles of radar energy reflection must be considered. When transmitted radar signal energy strikes an object surface, part of the energy is absorbed and part is reflected. The ratio of reflected to absorbed energy depends primarily on the material composition of the object. Metals such as copper, aluminum, and steel are very good reflectors, and the ratio of reflected to absorbed energy is high for these materials. Wet ground and masonry are fair reflectors, and materials such as glass, asphalt, and dry ground are poor reflectors. Since the angle at which reflected energy leaves the object surface is equal to the incidence angle of the transmitted energy, the reflecting surface must be normal to the incident radar energy to reflect the energy back to the radar receiver. The intensity of radar returns therefore depends on both the reflector material and the incidence angle of the radar energy. Some amount of reflected energy is received from almost all objects, and it has been determined that reflections are due to small facets of the object. Objects which have rough surfaces will usually reflect some energy back to the radar receiver because of the many opportunities for obtaining normal incidence. Smooth objects such as roads and quiet bodies of water do not reflect much energy back to the radar receiver unless the receiver is directly above them. These objects therefore usually do not show on the radar screen. The intensity of reflections from natural terrain depends upon terrain slope or rise gradient. It is generally accepted that reflections from terrain become significant when the rise gradient is 100 feet in 1600 feet of linear distance. As the rise gradient increases, opportunities for normal incidence increase, resulting in stronger radar returns. For cultural objects such as buildings or bridges, many opportunities are usually present for double reflections (reflections from two surfaces at right angles to each other) which cause energy to be returned to the radar receiver. These objects therefore usually show on the radar screen. Some objects may not appear on the radar screen because of shadowing. Tall objects such as mountains or buildings cause terrain and other objects located behind the tall objects to be obscured. The occurrence and extent of this shadowing depends upon the relative heights of objects and the depression angle of the incident radar energy. Generally, tall objects and/or small depression angles cause large radar shadows. In making radar predictions, one must establish the nature of the terrain and other objects in the area of interest along with the radar set location. The physical situation is then analyzed, taking into account the various factors discussed above which affect the amount of energy returned to the radar receiver. The result of the analysis is a prediction of what is expected to appear on the radar screen.

Radar predictions are currently being produced by manual methods. The area to be covered by the prediction is located on a data base chart such as an ATC-200 or JOG-R chart. Effects of terrain are analyzed using the terrain contours on these charts. Graphic methods are used to determine radar shadowing (obscuration) and rise gradient (terrain slope) effects. Radar significant planimetry is located and its effects analyzed. Relative values of reflectivity (usually one of three values) are assigned to the various areas and planimetric features in the region covered by the prediction. These areas and features are rendered manually on an overlay sheet using different grades of pencils. Inherent radar set errors such as beam width, pulse length, and spot size errors are added to the expected returns from planimetry and terrain features. Ground clutter is added where appropriate by placing sandpaper beneath the overlay sheet and sketching lightly over the sheet with a pencil to produce a grainy textured appearance. The prediction sheet is then photographically reversed to obtain the redar prediction. On this final form of the prediction, bright radar returns appear as white areas on a black background, just as they would appear on the actual radar screen. Depending upon application, the prediction may also be annotated to identify target or offset aiming points.

The manual method of producing radar predictions is slow and tedious. In addition, the people who produce the radar predictions must be experienced in the interpretation of radar scope displays and skillful in the manual techniques required to produce the radar predictions. To reduce the time and personnel skill requirements, it is desirable to develop new radar prediction methods. The automated stereoplotter is particularly suitable for radar prediction. The time-consuming tasks of determining radar shadowing and rise gradient can be done automatically. Since the terrain data (the stereo model) in the stereoplotter is in a rather pure form, errors can be minimized. Planimetry for radar prediction can be extracted directly from the stereoplotter, using the most recent photographic coverage of the area over which the prediction is to be made.

SUMMARY

The present invention utilizes an automated analytical stereoplotter to produce a radar prediction which is a graphic product predicting how an actual radar set would appear if the radar was scanning some predefined geographic area. The prediction is based upon information about the terrain and other radar reflecting objects in the area of interest, along with empirical information on how these targets reflect radar signals. This information is processed within the stereoplotter to determine intensity patterns which are expected to appear on the screen of the radar set. The radar prediction is a graphic product portraying these intentisy patterns.

It is one object of the invention, therefore, to provide an improved radar prediction system utilizing a stereoplotter.

It is another object of the invention to provide an improved radar prediction system utilizing an automated analytical stereoplotter to automatically determine radar shadowing and rise gradient for a predefined geographical area.

It is yet another object of the invention to provide an improved radar prediction system for providing direct extraction of radar prediction planimetry from the stereoplotter utilizing latest photographic information of the area of interest.

These and other advantages, features and objects of the invention will become more apparent from the following description when taken in connection with the illustrative embodiment in the accompanying drawing in which the single FIGURE is a block diagram of the radar prediction system utilizing an automated analytical stereoplotter in accordance with the present invention.

DESCRIPTION OF THE PREFERRED EMBODIMENT

Figure 1:
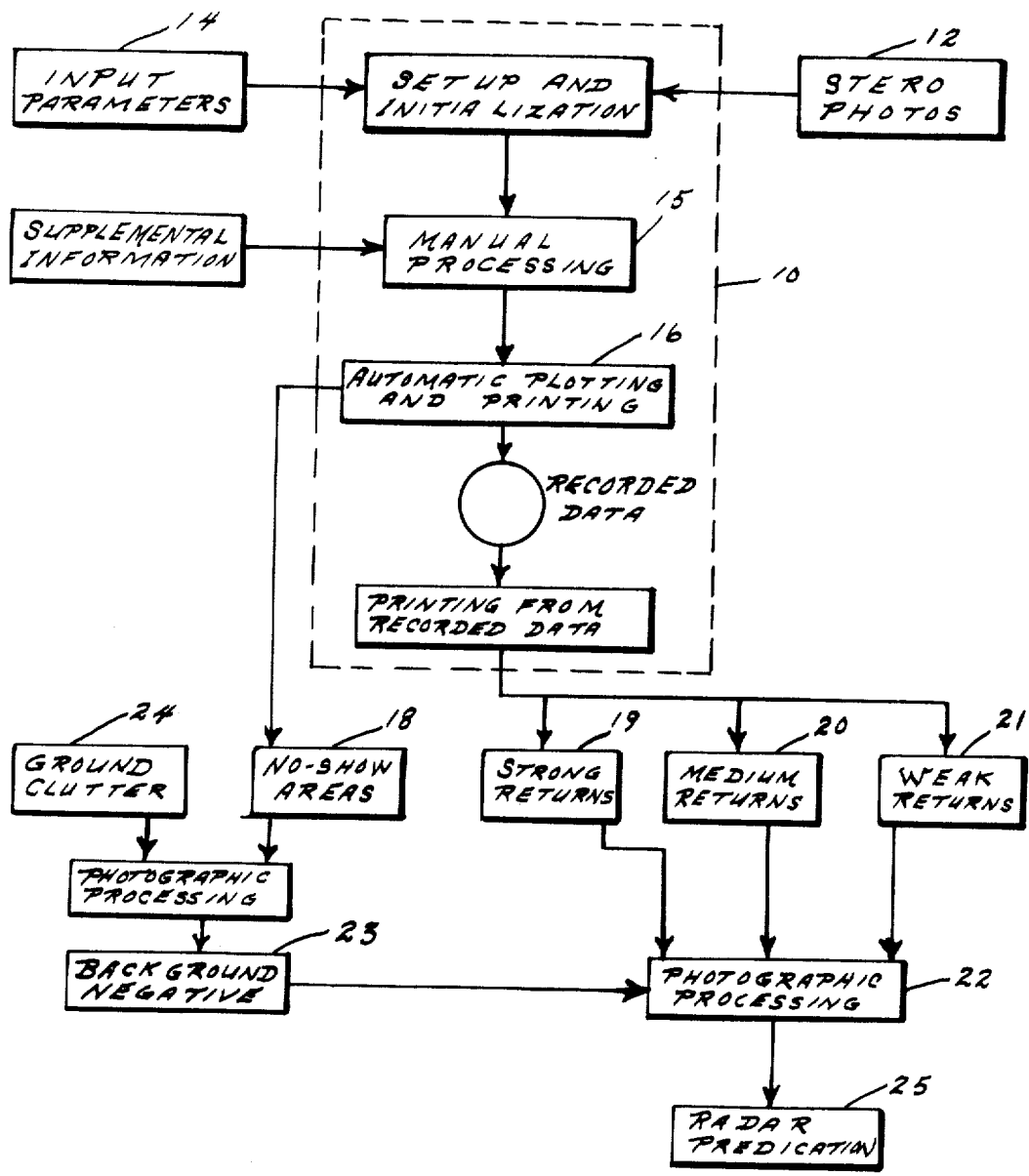

Referring now to the FIGURE, there is shown a radar prediction system utilizing an automated analytical stereoplotter 10 to provide a graphic display of predicted radar reflections from terrain features at a predefined geographical point. The stereoplotter is a conventional item which is available from Bendix Research Laboratories, Southfield, Mich. Input information in the form of stereophotographs 12 are placed in the stereoplotter 10 and the stereo model is set up. Certain input parameters 14, such as obscuration point location, flight line, plotting data, and radar set errors are also entered in the stereoplotter 10. Planimetry pertinent to radar prediction is then manually identified. Point targets, line targets, and area boundaries are stored in the computer for subsequent processing during automatic plotting. The expected intensity of radar returns from the planimetry is indicated in the stored data. In this procedure, four intensities are defined: strong, medium, weak, and no-show. The operator determines the intensity to be assigned to each target which is based on certain ground rules and supplemental information such as radar significance as indicated on ATC-200 and JOG-R charts. The model is then automatically profiled, using the circular profiling method. During profiling, decisions are made automatically to determine the intensity of returns which may be expected from the terrain and the stored planimetry data. Model coordinate and return intensity data are recorded on magnetic tape. During plotting, the no-show areas which were determined from obscuration, water areas, and other no-show targets are plotted directly on the coordinatograph to produce a no-show area window negative. When automatic plotting is finished, the magnetic tape is played back three times, and the recorded data used to drive the coordinatograph. On the first playback, the coordinatograph is controlled to produce a window negative of the strong return areas. The second and third playbacks produce the medium and weak return negatives, respectively. A preprinted negative containing a random spot pattern characteristic of the ground clutter expected from the radar set under consideration is combined photographically with the no-show window negative to produce a background negative. With successive exposures, the background negative is combined photographically with the strong, medium, and weak return negatives to produce the final prediction. The various steps of this procedure are described in greater detail in the following sections.

A stereo model containing the region over which the prediction is to be made is set up on the stereoplotter 10. The earth curvature constant R is not entered so that model corrections for earth curvature will not be made. This allows the earth curvature to affect obscuration comutations in the desired manner. The coordinates of the observation point $(X_o, Y_o, Z_o)$ and the direction of the flight lines are defined to the stereoplotter system. The $Z_o$ coordinate value of the observation point is corrected for earth curvature using $$Z_o = X_o - X^2 + Y_o - Y^2/2R$$

where $(\bar{X}, \bar{Y})$ is the point of tangency of the model surface with the earth surface, and $R$ is the Earth Radius in model scale. The boundaries of the region to be plotted (in $r$ and $Y$ coordinates), a radial indexing interval, and an angular increment are defined. The angular increment defines a set of radials on either side of the flight line. The intersections of these radials with the circular profiles (defined by the radial indexing interval) define points at which obscuration information (maximum profile points) are to be computed. Radar set parameters such as beam width, pulse length, and spot size errors are defined to the system. These errors are used to modify the printed output of the plotter to account for inherent radar set errors.

In the manual processing unit 15, the following steps are preformed. The radial indexing interval determines the output printing resolution in the range dimension. The resolution in the azimuth dimension is limited only by the ability of the programs to respond to small changes in model coordinates. Points for defining planimetry boundaries are therefore recorded only along the circular profiles. Areas such as lakes and other bodies of water are manually delineated in a prescribed manner (clockwise for example). Points are stored when the manual trace crosses a circular profile line. The position of the point is indicated by a profile number (radius divided by indexing interval) and an azimuth angle $(\gamma)$. The direction in which the trace crossed the profile is also indicated. This allows subsequent determination of whether plotting is proceeding into or out of the area. A code number indicating expected return intensity is also assigned to the set of points defining a boundary. Water areas, for example, would be assigned a code which indicates no-show area. Line type targets are traced, and points where the lines cross profiles are stored. A return intensity code is also assigned to these points. The area boundary points and the line target points are then sorted according to the sequence in which they will be required during subsequent automatic plotting. Since alternate profiles are plotted in opposite direction, the data is ordered oppositely, on alternate profiles. The data is then scanned by the computer for ambiguities. If any are found, the operator is notified so that he can resolve the ambiguities before plotting is started. Situations such as looping area boundaries can generate extraneous or ambiguous boundary points. Editing the planimetry data at this time reduces the amount of editing required for the printed output after plotting. Point targets are located, assigned intensity codes, and stored on magnetic tape. Exact locations of these points are recorded so that the locations of expected returns can be more exactly located on the printed output. Locating these points on the nearest profile could be too inaccurate since point targets are likely candidates for aiming points.

After the manual identification of radar significant planimetry, the area to be predicted is automatically plotted by the automatic plotting and printing unit 16. The stereoplotter 10 is operated in the circular profiling mode. The plotting is started near the obscuration point and is indexed out radially. As the system plots, obscuration is computed to determine radar shadow areas. The terrain slope is used to determine the expected intensity of returns from the terrain. The planimetry points are constantly drawn from the planimetry file to determine whether or not some predefined planimetric feature is being crossed. During the automatic plotting, the obscuration data, planimetry data, and terrain slope data are analyzed to determine expected return intensity. The terrain slope is analyzed to determine one of four levels of return intensity: strong, medium, weak, or ground clutter. The obscuration data is then considered, and if the terrain is obscured, the output is indicated as no-show regardless of terrain slope. Water areas are also indicated as no-show. While the system profiles, the no-show areas are printed on the coordinatograph by the drop-line method. The terrain elevation and return intensity data are also recorded on magnetic tape to be played back later. When plotting is completed, the print no-show negative is edited for obvious errors, and registeration marks are drawn on the negative.

When plotting is finished, an overlay is placed on the no-show negative. The point targets are then read from the magnetic tape. Targets coded as strong returns are sorted out and visited one by one. A coordinatograph stylus is selected on the basis of pulse length and spot size errors and is placed in the coordinatograph. At each target point, the operator decides whether or not the target is obscured (by looking at the no-show negative and/or the terrain model). If the target is not obscured, he pushes a button which causes the system to draw a circular arc the size and position of which are determined from the radar set errors (beam width, pulse length and spot size.) After the strong return point targets have been processed, the system is placed in a mode of operation in which the system reads the recorded data and prints a window negative of the strong return areas on the coordinateograph. The strong return negative is then removed (after registration marks are drawn), and another overlay sheet is placed on the no-show negative. The medium return point targets, line targets, and areas are then processed in the same manner as the strong returns. This process is then repeated for the weak return data. When this processing is completed, four nagatives will have been produced; the no-show negative 18, the strong return negative 19, the medium return negative 20, and the weak return negative 21. After editing, these negatives will be photographically processed in unit 22 to obtain the final radar prediction.

The photographic processing unit 22 produces the radar prediction which consists of making partial exposures on the final photographic film using various combinations of the window negative. A background negative 23 is prepared by reversing the no-show negative 18 with a ground clutter overlay 24. The ground clutter overlay negative 24 is dark with a random pattern of white specks to simulate groung clutter. In general, a different ground clutter pattern can be used for each different type of radar set. The background negative 23 which is obtained from this process is clear in the no-show areas and has a random pattern of black specks on a very light background in all other areas. The background negative 23 and the strong return negative 19 are placed on the final photograph film and a partial exposure is made. The medium return negative 20 is then placed on the stack and another partial exposure is made. The weak return negative 21 is then placed on the stack and the final exposure is made. When finished, the no-show areas will have received the total exposure and will therefore be darkest. Areas containing ground clutter only will be dark with white specks. Weak returns will be slightly lighter than the ground clutter area and will contain some ground clutter. Medium return areas will be lighter than weak return areas and will also contain some ground clutter. Strong return areas will be unexposed. When developed, this photograph is then the radar prediction 25. If desired, a negative containing annotation and other data can be placed on the stack during all exposures to produce white lines on the generally dark background of the prediction print.

The printing method described above requires the printing of four separate negatives. It is possible to modify an on-line electronic orthophoto printer to print the various grey levels in one step. The printer may be modified to print lines normal to the plotting direction. The length of these lines would be equal to the profile spacing. As the system plots, successive lines would be printed to produce a raster type strip along the profile line. The printer intensity would be controlled to print the various grey levels. In ground clutter areas, the printer intensity may be modulated by some suitable electronic noise waveform to produce the random speck pattern characteristic of ground clutter. The manner in which this noise is generated is critical since some correlation of noise signals between printed lines is desirable. When viewing a television set after the station has gone off the air, one notices a noise pattern generated (primarily) from the inherent noise of the electronic components of the set. The low-frequency noise spots appear long and thin because of the raster lines. For ground clutter it is desirable to obtain noise spots which are more nearly circular. To produce large noise spots, the noise must be somewhat correlated from line to line.

A method of printing the various grey levels directly on the coordinatograph is to use various stylus line widths. The strong return areas may be printed with a stylus which completely fills in the space between profile lines. The medium return may be printed with a stylus which fills in only half of the area (for example), and the weak return areas may be printed with a rather fine line. The printed output would appear to have four grey levels.

The present system may also be modified to provide a rectangular profile radar prediction. The rectangular profiling method of producing on-line radar predictions is basically similar to the circular profiling method described above. The primary difference is that plotting and other operations are preformed in a rectangular coordinate system rather than a polar coordinate system. For best results, the rectangular coordinate system should be oriented such that profiling is done in a direction normal to the flight path. Output printing methods used for rectangular profiling are basically the same as those used for circular prefiling. The raster printing is done in a rectangular rather than circular manner. An advantage of rectangular profiling is the rectangular format of the terrain data recorded on magnetic tape (when used). If this terrain data is to be subsequently processed by an off-line computer (for radar prediction or other purposes), the rectangular coordinate system is advantageous because it provides greater flexibility than the polar coordinate system.

Although the invention has been described with reference to a particular embodiment, it will be understood to those skilled in the art that the invention is capable of a variety of alternative embodiments within the spirit and scope of the appended claims.

What is claimed is:

1. A method of providing radar predictions from an automated analytical stereoplotter comprising the steps of:

defining the boundaries of the region to be plotted,
   storing the boundary limits and stereo photographic information in the stereoplotter,
   manually delineating the area type and linear type planimetry, and assigning intensity codes to each planimetric feature,
   locating point tartets, and assigning intensity codes to each point target,
   storing the locations and intensity codes for the point targets, area and linear planimetry on magnetic tape,
   plotting terrain model in the circular profiling mode,
   analyzing the terrain slope to determine expected return intensity.
   printing a no-show negative.
   printing intensity code negative, and
   photographically processing said no-show negative with said intensity code negatives to produce a final radar prediction.

2. A method of providing radar predictions as described in claim 1 wherein said no-show negative is combined photographically with ground clutter to provide a background negative.

3. A method of providing radar predictions as described in claim 1 wherein said point targets, areas and linear planimetry are read from said magnetic tape, said point targets, areas and linear planimetry are sorted out and classified into return categories, strong, medium or weak, negatives are printed respectively for the return categories, strong, medium and weak.

4. A method of providing radar predictions as described in claims 3 wherein the step of photographically processing said no-show negative further includes the steps of:

photographically combining said background negative with the strong, meidum and weak negatives to produce the radar prediction.

5. A method of providing radar predictions as described in claim 4 including the additional steps of:

making partial exposures of said background negative with each of said strong, medium and weak negatives on the final photographic film, said final photographic film being said radar predictions.

* * * * *